3,843,465
PRODUCTION OF CITRIC ACID FROM
HYDROCARBONS
Helmut Hustede and Diethelm Siebert, Ladenburg, Germany, assignors to Joh. A. Benckiser G.m.b.H.
No Drawing. Filed Mar. 16, 1973, Ser. No. 342,103
Claims priority, application Germany, Nov. 10, 1972,
P 22 12 929.9
Int. Cl. C12b 1/00
U.S. Cl. 195—28 R            16 Claims

ABSTRACT OF THE DISCLOSURE

Citric acid or its salts is manufactured from hydrocarbons such as paraffins with a yeast mutant in the presence of a decoupling chemical capable of suppressing the oxidative phosphorylation of the respiratory chain of the yeast during the fermentation. Citric acid or its salts is produced in remarkably high yields without concurrent production of iso-citric acid.

---

The present invention concerns a process for the manufacture of citric acid and its salts from hydrocarbons by fermentation with the use of a yeast.

Citric acid is a very common chemical which is used in the food, pharmaceutical, cosmetic and other industries in large, increasing volume. Its industrial production by microbial fermentation has heretofore been limited to the use of fungi and carbohydrates, as fermentation media.

In recent years, there has been disclosed in the literature and in patents the increasing interest for using other microorganisms such as yeasts or bacteria as well as the use of hydrocarbons as raw material for the fermentation to citric acid. For industrial scale production, these processes are not yet satisfactory enough since the yields in practice do not equal those obtained with the conventional methods using *Aspergillus* and carbohydrates as substrate.

The described processes are inadequate because the citric acid concentration in the fermentation suspension is still compartively low, and therefore working it up at the end of the fermentation is inefficient, time consuming and expensive. Moreover, in addition to the product citric acid, there is formed a significant amount of iso-citric acid, which under commercial large scale production can only be separated from the citric acid with inordinate difficulty. It is also known that the yeast *Candida oleophila* can produce citric acid in a relatively short-time fermentation in a medium containing a high percentage of carbohydrates. See for instance German patent disclosure DOS 1,812,710. Attempts to use *n*-paraffins in a concentration of about 10% in a fermentation medium can result in a yield of 120 to 140% of citric acid, based on the weight of added paraffin. However, the final product is shown by analysis to be a mixture of acids; namely 50 to 60 parts of citric acid and 40 to 50 parts of iso-citric acid. This is, of course, undesirable as discussed above in view of the great difficulties in separating these two acids of such close chemical structure.

Furthermore, attempts have been made to suppress the concurrent production of iso-citric acid. However, all these attempts resulted in a more or less pronounced shift of the balance of citric acid to iso-citric acid, but in no case was there a complete suppression of the iso-citric acid production. Hence these experiments too have been unsuccessful.

Unexpectedly, it has now been found in accordance with the invention, that iso-citric acid production can be completely suppressed concurrently with obtaining high yields of citric acid. In accordance with the invention, there is provided a process which comprises using a yeast which is capable of growth in the presence of high concentration of an aconitase-suppressing compound, like fluoro-acetate. This special yeast mutant is then cultivated to ferment an aqueous fermentation medium containing at least one *n*-paraffin (preferably having 9 to 20 carbon atoms) in the presence of a particular chemical, a decoupling chemical capableof suppressing the oxidative phosphorylation of the respiratory chain of the yeast. The citric acid fermentation is continued until the desired amount of citric acid has accumulated in the medium. The acid is then separated as such or as its salts; for instance, the alkali or alkaline earth salts.

In accordance with the invention it is now economically feasible for the first time to produce citric acid on a large industrial scale from hydrocarbons raw materials at a particularly advantageous efficiency price ratio. This is of course of great industrial significance, especially in view of the increasing world shortage of carbohydrates. Moreover in contrast to the prior art, the invention provides a process for the preparation of citric acid in the absence of iso-citric, and therefore there occurs none of the difficulties for the isolation of pure crystalline citric acid from the fermentation liquor, as was traditionally encountered.

It was therefore an object of the invention, and of the work leading to it, to influence the regulatory process of yeast cells so that when hydrocarbons are used as substrate, large amounts of citric acid, but no iso-citric acid, are formed.

In accordane with the invention, the fermentation of the yeast in a hydrocarbon-containing medium is carried out, for best results, in the concurrent presence of an aconitase-suppressing chemical and a chemical which acts as a decoupling agent of the phosphorylation of the respiratory chain of the yeast.

At this point of the disclosure of the invention, it is to be noted that increasing the yield of citric acid using an aconitase-suppressing compound in a citric acid fermentation with bacteria, yeasts, or fungi with the use of carbohydrates or also hydrocarbons is known. See for instance the following prior art literature: Germany Patent Disclosure Nos. 2,115,514, 2,065,206 and 1,808,615. However, the prior art does not describe a process whereby there is also present a decoupling agent capable of suppressing the oxidative phosphorylation of the yeast. The unique combination of an aconitase-suppressing compound together with the decoupling compound brings about the unexpected advantage that there is no production of iso-citric acid. It is noteworthy that pursuant to work carried out in connection with this invention, when carbohydrates are used as fermentation raw materials, no increase in the yield of citric acid could be observed even with the use of increasing amounts of a decoupling chemical. Indeed increasing amounts of the decoupling chemical result unexpectedly in a decrease in the yield of citric acid. In contrast, in accordance with this invention, there is observed with the use of *n*-paraffins as a source of assimilable carbon, an increase in citric acid yields upon the addition of an aconitase-suppressing compound, the effect of which is further enhanced by the use of the decoupling chemical, called for by the invention. Furthermore, it is observed that the production of iso-citric acid is completely suppressed.

The use of an aconitase-suppressing compound, such as fluoro-acetate in the fermentation on a large industrial scale is excluded because it is price-wise prohibitive. A noteworthy aspect of the invention was to avoid the need for adding an aconitase-suppressing compound during the fermentation itself. It was therefore sought to make the anti-metabolite-effectuated aconitase suppression permanently established by a genetic change.

It was unexpectedly determined that certain yeast strains which have a lower capability to form citric acid have their growth inhibited already with a smaller concentration of fluoro-acetate than those strains which have a higher capability of citrate production. Based on this work, a process was developed for selecting a yeast strain which was well suited for a process wherein the production of citric acid by the microorganism was markedly increased.

An embodiment of the invention provides a process for fixing the aconitase-inhibiting property by a genetic change so as to obviate the necessity of adding an aconitase inhibiting chemical to the fermentation, and develop a strain which responded to the subsequent addition of the decoupling chemical. The process of the invention thus provides a preliminary selection procedure to develop a yeast mutant which produces citric acid exclusively, in high yields, which process comprises treating in a known manner, a cell suspension of a yeast with a known mutating agent, for instance: nitrite, 1-methyl-3-nitro-1-nitrosoguanidine, ultra-violet or X-ray radiations or others, which traditionally are used. For the production of mutants reference is made to known procedures such as those disclosed in *Allegemeine Mikrobiologie*, H. G. Schlegel, Georg Thieme Verlag, Stuttgart (p. 338–341), 1969. In accordance with the selection procedure, the treated cell suspension is inoculated into a glucose-mineral medium and in the course of the following incubation, which lasts for several days, at 28° C., the yeast is treated with increasing concentrations of an aconitase-suppressing agent; i.e. an anti-metabolite for citric acid or its precursor in the synthesis chain. Typical thereof is for instance, a halogenated mono-, di-, or tricarboxylic acid, its salts or amides, in particular monofluoro acetate. The final concentration is up to $5 \times 10^{-2}$ mole/liter. Typical aconitase-suppressing agents include more specifically the following halogen-containing compounds: chloro- or fluoro-substituted (in the alpha-position) lower alkane mono- or dicarboxylic acids, their water-soluble salts and amides. Trichloro-acetic and, trifluoro-acetic acid, chloro-acetic acid, fluoroacetic acid, chloro-succinic acid, their salts and amides are such compounds. Other such suitable agents are disclosed in German Patent Disclosure Nos. 2,115,514 and 2,065,206.

In accordance with this treatment, there is a marked increase in production of mutants which have the characteristic of producing a high concentration of citric acid. These mutants are then plated out on nutrient dishes, and are isolated in accordance with microbiologically known techniques. The selection technique used herein provides a significant saving in time and work and increases the likelihood of developing a suitable mutant. The alternative for isolating a desired mutant from inoculated colonies in fermentation test where they would form a very low percentage of the cells present after mutation is not satisfactory. In accordance with the procedure developed, there have been successfully isolated mutants of the yeast type (*C. oleophila*) which were identified, in contrast to the original strain, as having a strongly increased capability of producing citric acid in a hydrocarbon medium.

When such a mutant is inoculated into an *n*-paraffin nutrient media, there was unexpectedly discovered that not only is the yield of citric acid remarkably increased but also that the percentage of iso-citric acid concurrently produced is suppressed to about 0.5 to 5%, depending on the particular mutant stock, as compared to the amount of 40% of all the acid produced with the original stock.

Moreover, in accordance with the second embodiment of the invention, there is added to the fermentation a decoupling agent of the phosphorylation of the respiratory chain of the yeast. A fast, efficient and active formation of citric acid is obtained an accordance with this invention when after 24 hours of growth in an *n*-paraffin nutrient medium, there is added 2,4-dinitrophenol or an equivalent decoupling chemical to a concentration in the range of about $10^{-2}$ to $10^{-7}$ mole/liter. There may be used preferably a total amount of 10% by weight of hydrocarbon. As source of assimilable source of carbon, there may be used particularly *n*-paraffins (straight-chain paraffins), especially those having 9 to 20 carbon atoms or a suitable mixture of such *n*-paraffins. The fermentation is terminated in 85 hours and no iso-citric acid could be determined in the medium by thin layer chromatography or even by an enzymatic test using iso-citrate-dehydrogenase. Citric acid was the only acid present.

The yeast stock or a mutant desired therefrom such as one having a genetically fixed, reduced aconitase activity is inoculated from an agar slant tube into a medium suitable for cell multiplication and cultivated therein for 24 hours with shaking or stirring. A prepared cell suspension of this type is used to inoculate a further preliminary culture which contains at least one *n*-paraffin of a chain length of from 9 to 20 carbon atoms. In other aspects, the fermentation of the medium and other parameters for cultivating the yeast is conventional.

The supply of nitrogen to the nutrient medium can be made by inorganic or organic nitrogen-containing compounds which may be used individually or together are added to the medium. For instance, the following sources of nitrogen can be added: ammonia, ammonium chloride, ammonium sulphate, ammonium phosyhate, ammonium acetate, urea, amino acids, peptone, yeast extract, fish meal, corn meal and other such compounds which are used in a concentration so that the fermentation medium contains an adequate source of assimilable nitrogen to allow the growth of the microorganism for 24 hours. Also, vitamins, for instance, thiamine hydrochloride or nicotinic acid may be added to the nutrient media in suitable concentration as is known in the prior art. Such sources of vitamins like yeast extract, corn meal powder or liquor can be used; likewise, the essential trace elements like iron, zinc, cobalt. The yeast is cultivate with shaking in a conventional manner in a medium having sufficient nutrients for 24 hours.

As nutrient salts there can be used inorganic compounds like disodium hydrogen phosphate, dipotassium hydrogen phosphate, potassium dihydrogen phosphate, magnesium sulphate manganese chloride or manganese sulphate, calcium chloride or sodium chloride and others are useful. The source of trace elements can be synthetic or natural.

As a carbon source there can be used also carbohydrates or carbohydrate-containing materials which may be added to the medium in limited quantity, but in addition the nutrient medium must in accordance with the invention, contain at least one hydrocarbon for instance more specifically an *n*-paraffin containing from 9 to 20 carbon atoms or a suitable mixture of such paraffins as the main source of carbon.

The cultivation of the yeast strain is carried out during the main fermentation under aerobic conditions provided by the shaking of the culture containers or by the known submerged process with stirring and aeration. The amount of air that is provided is from about 15 to 120 times the volume of medium per hour. This is in accordance with conventional procedures for fermenting yeast. The fermentation is carried out advantageously at a pH range value between 3.5 and 8.0 and at a temperature range from about 20° to 35° C.

The invention comprises in one embodiment a pre-selection of the desired strain of yeast, the preculturing of this strain to develop the desired genetically fixed properties, then preculturing in a medium containing a hydrocarbon medium in the presence of the acotinase-suppressing agent. After 24 hours of cultivating, the growth of the yeast is terminated. At that time, the preculture is used as an inoculum in the main fermentation process. In that fermentation there is added to the cell suspension a decoupling agent, as described herein, and during the fermentation which follows the medium becomes rapidly enriched with citric acid to give large yields of citric acid; yet no iso-citric acid is formed.

Depending on the concentration of hydrocarbons which is used, the fermentation is generally terminated within two to five days and the citric acid as such or as an alkaline or earth alkaline salt is then isolated in a traditional manner or is worked up and separated from the culture solution.

In accordance with the invention, the decoupling agent which is added to the fermentation substantially at the end of the growth period of the yeast is any substance which has the property to suppress or completely eliminate the oxydative phosphorylation in a microorganism without affecting the electron transfer system of the microorganism's respiratory chain. Chemicals which are best suited for this purpose are, for instance, pentachlorophenol; 2,4-dinitrophenol; 4,5,6,7-tetrachloro-2-(trifluoromethyl)bezimidazole, mesoxalonitrile - [p-(trifluoromethoxy)phenol] - hydrazone, carbonylcyanide-m-chlorophenyl-hydrazone(CCCP); 2,6-dibromophenol (DPB); Atebrin or dicumarin.

The present invention is of commercial significance in that it is capable of avoiding the production of iso-citric acid in a large scale production of citric acid from paraffins by fermentation. The yields of citric acid are in the range of 150% based on the added paraffin, a yield which is by far in excess of those obtained by conventional processes; for instance, those processes using carbohydrates as a substrate. In accordance with this invention, the high yield of citric acid concentration in the fermentation media which is obtained, especially without iso-citric acid, offers a process for a commercial production of citric acid of marked importance. The invention is illustrated in a non-limiting manner by the following examples.

EXAMPLE 1

(A) Pre-selection of Mutant

For preparation of the suitable mutant, *Candida oleophila* ATCC No. 20,177 is taken from an agar slant and inoculated in 25 ml. of a glucose mineral medium containing the following: 1% glucose; 0.05% $KH_2PO_4$ 0.02% $MgSO_4 \cdot 7H_2O$; 0.025% $MnSO_4 \cdot 4H_2O$; 0.28% $NH_4Cl$; 0.05% yeast extract and 0.1% $NaHCO_3$. The inoculated medium is shaken for 48 hours at 28° C. With this preculture, there is inoculated a second glucose mineral culture medium so that the starting concentration of cells is about $1 \times 10^7$/ml. After 15 hours of incubation at 28° and shaking, the cells are in the logarithmic growth stage and have reached a concentration of $8 \times 10^7$/ml. To 5 ml. of this growth culture are added 0.05 ml. of a mutant inducing chemical, 1-nitroso-3-nitro - 1 - methyl-guanidine solution (50 mg./ml.), and the solution and cells are shaken for 2 further hours at a temperature of 28° C. During this period about 99.9% of the cells are killed. The reaction is terminated by centrifuging and the cells are washed with a 0.9% solution of sodium chloride. Thereafter the cells are suspended and shaken at 28° C. in a full medium containing 5% glucose, 0.5% peptone, 0.3% yeast extract, and 0.3% malt extract.

During the subsequent five days of incubation, the cells are transferred each day into a fresh full medium containing an increasing amount of the acetate of one mole/liter is obtained. Thereafter the cell suspension is diluted and plated out on full medium on culture trays. The surviving cells grow within two days into colonies. These are then transferred on glucose mineral agar dishes by replica plating, the dishes having different concentrations of fluoro-acetate. After two days of incubation, the plates are sprayed with a cell suspension of the original *C. oleophila* ATCC 20,177 strain (about $10^7$ cells/ml.) in glucose mineral medium and incubated for two more days. On the plates with a concentration of $10^{-1}$ mol/l. of the fluoro-acetate, the wild strain (the non-mutant type) does not grow any more. The previously grown mutant of strongly producing citric acid can be recognized or identified by the circle of satellite colonies of the original strain, surrounding them and can be isolated.

(B) Fermentation

The mutant strain AC 7 of the original *C. oleophila* ATCC 20122 is isolated as described above and is maintained on an agar slant having a medium of yeast malt extract-peptone-glucose-agar and then inoculated into 50 ml. of liquid medium having the same composition and then shaken for 24 hours at 28° C. The well-grown suspension is then transferred into 500 ml. of a medium having the following composition: 0.05% $KH_2PO_4$; 0.02% $MgSO_4 \cdot 7H_2O$; 0.025% $MnSO_4 \cdot 4H_2O$ 0.25% $NH_4Cl$; 0.05% corn steep powder, 2% (by volume) n-dodecane, 1% Ca $CO_3$. After 48 hours of cultivation, this culture is inoculated into a second preculture of 5 liter volume and cultivated in a fermentation vessel with aeration and stirring for 24 hours. Two liters of the resulting cell suspension are used as inoculum for 30 liters of the following fermentation medium: 0.05% $KH_2PO_4$; 0.02% $MgSO_4H_2O$; 0.025% $MnSO_4 \cdot 4H_2O$; 0.25% $NH_4Cl$; 0.05% corn steep powder; 8% $CaCO_3$ and 10% (weight per volume) n-dodecane.

The fermentation is carried out in a 50-liter fermentation tank at a temperature of 28° C. with stirring at 600 r.p.m. and a flow of air of 0.7 liter per liter/minute. After 24 hours of cultivation there is reached a maximum cell count of about $8 \times 10^8$ cells/ml. indicating the end of the growth phase.

At this time there is added $1 \times 10^{-4}$ mole of 2,4-dinitrophenol per liter of medium. After a total of four days of fermentation the citric acid concentration in the medium is 128 grams per liter. Iso-citric acid could not be found.

The citric acid is separated from the medium by addition of hydrochloric acid to the medium filtering off the yeast cells and precipitating with calcium hydroxide as tricalcium citrate. After filtration and treatment of the filter cake with sulfuric acid, the crystalline citric acid can be obtained by evaporation.

Instead of using 2,4-dinitrophenol the fermentation is repeated using instead an equivalent amount of the following: pentachlorophenol; 4,5,6,7-tetrachloro-2-(trifluoromethyl)benzimidazole. Likewise good yields of citric acid are obtained without iso-citric acid.

EXAMPLE 2

The fermentation process is carried out as shown in Example 1. Instead of using n-dodecane, (10% by weight of volume) there is used an n-paraffin mixture of the following composition: 8% n-decane, 41% n-undecane, 38% n-dodecane, 12% n-tridecane, 1% n-tetradecane and instead of $CaCO_3$, there is used 10% of $NaHCO_3$. The fermentation proceeds in a similar manner and the citric acid yield which results is approximately that of Example 1, namely 131 grams of citric acid per liter. Iso-citric acid could not be found.

A like fermentation is carried out with n-nonane in one experiment and in another one, with n-octadecane in the hydrocarbon mixture used hereinabove. Good production of citric acid is obtained.

EXAMPLE 3

The procedure of Example 1 is repeated omitting the dodecane, replacing it by the equivalent amount of n-decane, and undecane. Neutralization of the medium is carried out by sodium hydroxide. To work up the solution, the yeast cells are separated by filtration. The solution is concentrated under vacuum and tri-sodium citrate is crystallized out directly.

EXAMPLE 4

The fermentation process is carried out in accordance with Example 1 except that the 2,4-dinitrophenol is omitted. After a fermentation of four days, the citric acid concentration in the fermentation liquor reached 114 grams per liter and furthermore there could be found 4.5 grams per liter of iso-citric acid.

EXAMPLE 5

*Candida oleophila* ATCC No. 20,177 is taken from an agar slant having yeast malt extract-peptone glucose-agar and transferred to a liquid medium of the same composition and shaken at 28° C. for 24 hours. The cell suspension is used to inoculate a pre-culture containing 2% n-dodecane and of otherwise the same composition as is described in Example 1 and is grown for 48 hours with aeration. 10 ml. of this culture are transferred into 100 ml. of the fermentation medium described in Example 1. The fermentation followed in a one-liter round glass shaking flask at 28° C. The following is added to the liquor after fermentation has started in the following manner. After 15 hours there is added $5 \times 10^{-5}$ mole/liter of fluoroacetate and after 24 hours there is added $1 \times 10^{-4}$ mole/liter of 2,4-dinitrophenol. After a four-day incubation the citric acid concentration in the medium reached 107 grams per liter and no iso-citric acid could be found.

EXAMPLE 6

The work shown in Example 5 is repeated however omitting the addition of 2,4-dinitrophenol. There is obtained 98 grams per liter citric acid and 6 grams per liter of iso-citric acid.

EXAMPLE 7

The experiment of Example 5 is again repeated however without the addition of fluoro-acetate. After five more days of fermentation, the concentration of citric acid reached is 79 grams per liter and a concentration of iso-citric acid was 28 grams per liter.

EXAMPLE 8

Example 5 is repeated; however, this time neither the fluoro-acetate nor the 2,4-dinitrophenol is added. After a four-day fermentation, there is obtained a concentration of about 72.5 grams per liter of citric acid and 50.5 grams per liter of iso-citric acid.

EXAMPLE 9

In Example 1, there is replaced the 2,4-dinitrophenol by dicumarin. Likewise, good yields of citric acid without iso-citric acid were obtained.

Instead of using the yeast which is described above or the mutants derived therefrom in accordance with the invention, there can be used any type of yeast which is capable of producing citric acid and which can grow in the presence of an aconitase-suppressing agent, or an antimetabolite for citric acid or is precursor, more particularly in the presence of high concentration of fluoroacetate. For this purpose mutants which are particularly valuable are not only of the already menitoned *Candida oleophila* ATCC 20,177 particularly the mutants AC 7, DSM 343, deposited in the German National Depository of microorganisms in Goettingen, Germany, and also deposited with the United States Depository, registered by Nos. ATCC 20373 and EB16 by ATCC 20372, respectively. Also mutants obtained according to Example 1 from the original stocks of the *Candida lipolytica*, ATCC 8661, 8662 and 9773 are useful.

Representative of the state of the prior art in addition to the patents named herein, are the following: German Patent Disclosures: 2,050,361 (1971); 2,002,048 (1970); 2,005,848 (1970); U.K. Pats. Nos. 1,203,006 (1970); 1,204,635 (1970); 1,211,246 (1970) and Japanese Patent Disclosure No. 20.707/1968, among others. This listing does not purport to be exhaustive, only illustrative.

EXAMPLE 10

The mutant EB16 (ATCC 20,372) is isolated from a medium containing monofluorocitrate (final concentration 1 mole per litre). The fermentation is carried out with 2,6-dibromophenol in equivalent amount.

Good yields of citric acid without iso-citric acid are obtained.

We claim:

1. A process for the manufacture of citric acid, or its salts from hydrocarbons by fermentation using yeast which comprises fermenting an aqueous nutrient medium with a yeast, said medium comprising a n-paraffin having about 9 to 20 carbon atoms in the presence of a decoupling chemical capable of supressing the oxidative phosphorylation without affecting the electron-transport system of the respiratory system of the yeast, said yeast being capable of growth in the presence of a high concentration of an aconitase-suppressing compound.

2. The process of claim 1 wherein citric acid is produced essentially without iso-citric acid.

3. The process of claim 1 which comprises selecting the yeast in a medium of an increasing concentration of an aconitase-suppressing agent.

4. The process of claim 1 wherein the decoupling chemical is 2,4-dinitrophenol.

5. The process of claim 1, wherein the acontiase-suppressing compound is fluoro-acetate.

6. The process of claim 1 which comprises adding the decoupling chemical to the fermentation medium at a preselected time, at the termination of the growth stage of the yeast.

7. The process of claim 1 wherein the yeast is of *Candida oleophila* or *lipolytica*.

8. The process of claim 1 which comprises growing the yeast in the presence of an aconitase-suppressing agent prior to the addition of the decoupling chemical.

9. The process of claim 6 wherein the decoupling agent is added to the medium in a concentration of from $10 \times 10^{-2}$ to $1 \times 10^{-5}$ mole/liter.

10. The process of selecting a yeast mutant having the property of producing citric acid without iso-citric acid in a hydrocarbon medium in the presence of a decoupling chemical capable of suppressing the oxidative phosphorylation of the yeast's respiratory system which comprises growing a yeast of the *Candida* type in a nutrient medium containing selectivley increased concentrations of an aconitase-suppressing compound.

11. The process of claim 10 which comprises using the yeast mutant so produced to ferment a nutrient medium containing an n-paraffin having 9 to 20 carbon atoms in the presence of a decoupling chemical capable of suppressing the oxidative phosphorylation of the yeast's respiratory system.

12. The process of claim 11 wherein the decoupling chemical is added to the medium at the end of the growth phase of the yeast.

13. The process of claim 12 wherein the decoupling chemical is pentachlorophenol.

14. The process of claim 12 wherein the decoupling chemical is 2,4-dinitrophenol.

15. The process of claim 12 wherein the aconitase-suppressing compound is fluoro-acetate.

16. The process of claim 11 wherein the yeast is *Candida oleophila* or *Candida lipolytica*.

References Cited

UNITED STATES PATENTS

| | | | |
|---|---|---|---|
| 3,717,549 | 2/1973 | Roberts | 195—37 |
| 3,689,359 | 9/1972 | Fukuda et al. | 195—28 R |

OTHER REFERENCES

Mahler et al.: "Biological Chemistry," pp. 526–528, 602 and 613–614.

A. LOUIS MONACELL, Primary Examiner

R. B. PENLAND, Assistant Examiner

U.S. Cl. X.R.

195—37